(12) United States Patent
Suga et al.

(10) Patent No.: US 6,668,048 B1
(45) Date of Patent: Dec. 23, 2003

(54) CONFERENCE COMMUNICATION SYSTEM

(75) Inventors: Susumu Suga, Tokyo (JP); Shoji Aizawa, Tokyo (JP); Shinji Endo, Tokyo (JP); Kazuhiro Takizawa, Tokyo (JP); Ichiro Inoue, Tokyo (JP)

(73) Assignees: NEC Corporation, Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/487,569

(22) Filed: Jan. 19, 2000

(30) Foreign Application Priority Data

Jan. 19, 1999 (JP) ............................................ 11-010871

(51) Int. Cl.⁷ .......................... H04M 3/42; H04L 12/16; G06F 15/16
(52) U.S. Cl. .................. 379/202.01; 370/260; 709/204; 348/14.08
(58) Field of Search ....................... 379/202.01–206.01, 379/88.25; 370/260; 709/204; 348/14.08, 14.09, 14.11

(56) References Cited

U.S. PATENT DOCUMENTS

| 5,323,445 A | * | 6/1994 | Nakatsuka | ............... | 348/14.09 |
| 5,533,102 A | * | 7/1996 | Robinson et al. | ......... | 379/88.25 |
| 5,625,407 A | * | 4/1997 | Biggs et al. | .............. | 348/14.11 |
| 6,466,252 B1 | * | 10/2002 | Miyazaki | ................. | 348/14.08 |

FOREIGN PATENT DOCUMENTS

| JP | A 63-35054 | 2/1988 |
| JP | 3-45063 | 2/1991 |
| JP | 6-245240 | 9/1994 |
| JP | 6-284198 | 10/1994 |
| JP | A 7-131538 | 5/1995 |

\* cited by examiner

Primary Examiner—Benny Tieu
(74) Attorney, Agent, or Firm—Young & Thompson

(57) ABSTRACT

An unscheduled terminal unit is prevented from being connected to conference communication or a scheduled terminal unit is prevented from being not connected to the conference communication, and security of the conference communication is improved, and also, a conference server for interconnecting many terminal units is connected to a private branch exchange and reservation tables for using the conference server are provided in order to surely charge users for conference communication service. When an incoming call for requesting connection of the conference communication comes to the private branch exchange, the validation is identified by whether the incoming call has been registered in the reservation tables or not, and the connection is rejected for the invalid incoming call.

9 Claims, 3 Drawing Sheets

Time $t_1$       Dial – in Number 1   Dial – in Number 2

| Outgoing ID a | Server Number 1 | Server Number 2 |
|---|---|---|
| Outgoing ID b | Server Number 5 | Server Number 6 |
| Outgoing ID c | Server Number 7 | Server Number 8 |
| ---------- | ---------- | ---------- |
| Outgoing ID n | Server Number (n – 1) | Server Number (n) |

FIG.2a

Time $t_1 + a = t_2$       Dial – in Number 1   Dial – in Number 2

| Outgoing ID | Server Number 1 | Server Number 2 |
|---|---|---|
| ---------- | ---------- | ---------- |
| ---------- | ---------- | ---------- |
|  |  |  |
|  |  |  |
|  |  |  |

FIG.2b

CONFERENCE COMMUNICATION SYSTEM

CROSS REFERENCE TO RELATED APPLICATIONS

The present invention claims priority from Japanese Patent Application No. 11-010871 filed Jan. 19, 1999, the contents of which are incorporated herein by reference.

BACKGROUND OF THE INVENTION

1. Field of the Invention

The present invention relates to a conference communication system for conducting conference communication with three or more terminal units by making connection to one MCU (Multipoint Control Unit) from a public network. Particularly, the present invention relates to a system in which the MCU is connected to a private branch exchange and connection to the MCU is made by gaining access to a dial-in number of this private branch exchange from the public network and the conference communication is set. The present invention is used in the conference communication conducted by ISDN (Integrated Services Digital Network). The present invention is a system developed for an offer of conference communication service of communication carriers for providing value-added network service (hereinafter called "type II carriers") other than communication carriers for providing public networks (hereinafter called "type I carriers"), but can be wide used in the conference communication via networks.

Generally, connection in which three or more telephone terminal units can call mutually simultaneously is referred to as "conference call", but in this specification, communication including image and digital information other than voice call information is referred to as "conference communication" rather than "conference call". That is, the present invention can be used in the conference communication including image and other information other than voice information. The present invention relates to a security system for identifying validation of the terminal units participating in the conference communication to prevent disadvantages that unexpected people participate in the conference communication or the contents of the conference communication are intercepted by other people without participators of the conference communication knowing about it.

2. Description of Related Art

In the past, a system in which a MCU for making conference communication connection mutually is arranged in a network and connection to terminals of the MCU from terminal units belonging to the network is made and thereby three or more terminal units mutually conduct conference communication has been known. That is, the MCU has many terminals and relays information incoming to one of the terminals to other plural terminals simultaneously. It is known that the MCU is configured so as to interconnect image and other information as well as voice signals.

Referring to the public MCU as one example, one MCU is provided with many terminals, and connection among the terminals can be set and modified by control software. Conference communication mode can be set among, for example, three terminals (A, B and C) of these many terminals. The conference communication mode is configured so that one common image is created by image information incoming to these three terminals and voice information incoming to one of the three terminals is relayed to the other two terminals while sending this common image to the three terminals as image information. For example, when face images of participators of a conference come to the terminals A and B and further an image signal indicating lists and graphs for conference material along with the face images comes to the terminal A, the two face images coming to the terminals A and B and the lists and graphs coming to the terminal A are superimposed on one computer screen. Then, voice information incoming to any of the three terminals (A, B and C) is relayed to the other terminals while sending an image of this computer screen to the three terminals (A, B and C).

When personal computers in which corresponding software is installed are connected to the three terminals, respectively, the conference communication can be conducted mutually among the personal computers. That is, while the screen formed of the face images of the terminals A and B and the lists and graphs of the terminal A as described above is displayed on the respective three computer screens as the common image, the conference communication can be carried out mutually among the three personal computers through the MCU.

By arranging the above MCU in ISDN and using three personal computers as terminal units, respectively, and making connection to the MCU through ISDN lines (two B channels of 64 kb/s), a television conference call can be formed mutually among the three personal computers located at remote sites. Then, the MCU can be arranged in a private branch exchange capable of connection by dial-in. It can become communication carriers (type II communication carriers) for providing conference communication service to customers at a charge by providing such private branch exchange and MCU.

A method in which after a user of conference communication once gain accesses to an access number in the above system having such configuration, conditions capable of conducting the conference communication are set and then an outgoing person is called back is disclosed in Japanese Unexamined Patent Publication No. 45063 of 1991 or No. 284198 of 1994. Also, technique for setting the above system to ISDN or for making connection using sub-addresses of ISDN is disclosed in Japanese Unexamined Patent Publication No. 245240 of 1994.

In the above-mentioned conventional system, a terminal unit unexpected by an organizer for conducting the conference communication (a delegate of users of one conference communication) or a provider of conference communication service (type II communication carrier) may participate in the conference communication. For example, in the case of going public the access number (telephone number for voice communication method) to the MCU as described above, if an intruder irrelative to a specific group certainly requests connection by the access number when the group secretly conducts the conference communication, the connection of the conference communication is set to the intruder. In this case, if the intruder does not say, the conference communication may possibly proceed with the conference communication intercepted by the intruder without valid participators of the conference communication knowing about it.

As described above, the connection to the access number may be made due to spite of the intruder conducting the conference communication or a number error or a connection error of an exchange even if the intruder is not deliberate. In the case of setting the number of use terminals of the MCU, namely, a maximum of the terminal units capable of participating in one conference, if the connection to such an unexpected intruder is made in error, the connection to valid conference participators may not be made subsequently.

In such conference communication service, technique for using a password to identify validation of the terminal units participating in the conference communication has been well known. This is to make users send a password known only by valid users and providers of communication service on the connection and validate the users by a manager for managing the conference communication. However, sending and check of the password require considerable equipment and connection operations, so that there are disadvantages that a procedure of connection answers on the connection becomes complicated and time necessary for connection becomes long.

Also, when the type II communication carrier provides such conference communication service, the communication carrier needs to exactly charge the terminal units using the conference communication for use rates, but it is possible to participate in the conference communication without payment of the use rates in the above-mentioned conventional system. For example, even for members of the specific group conducting the conference communication, payment of the rates can be avoided by participating in the conference communication without informing the communication carrier of this. In order to prevent this, as disclosed in the above Unexamined Patent Publication, the method of callback from the side of the service provider to the user having performed the connection request has been wide used. However, in this case, communication rates (or call rates paid for the type I communication carrier) necessary from the terminals participating in the conference communication to the MCU are borne by the communication carrier providing the conference communication. Even if the communication carrier may charge this rates to the user by being included in the use rates of the conference communication, it is undesirable for the communication carrier to conduct this charge as business tactics since the use rates of the conference communication is preferably as low as possible in appearance.

Further, in the above-mentioned conventional system, when the communication carrier providing the conference communication service accepts a reservation for conference communication from a customer, the reserved customer is informed of access numbers to which the customer will gain access at the time conducting the conference communication. The communication carrier previously operates the MCU used corresponding to the access numbers, and sets conference connection at the scheduled time. Then, the communication carrier providing the service prepares the access numbers for making connection to the MCU (for using a private branch exchange, dial-in numbers) by the maximum number of terminals capable of making connection to the MCU in telephone networks or ISDN. This causes the fixed cost which needs to be paid every month for the provider of the telephone networks or ISDN (type I carrier) according to the number of acquired access numbers regardless of the presence or absence of use of the conference communication.

SUMMARY OF THE INVENTION

The present invention is created under such circumstances, and an object of the present invention is to improve security of conference communication service. That is, an object of the present invention is to provide a conference communication system capable of surely preventing an unscheduled or unexpected terminal unit from being connected to conference communication. Another object of the present invention is to provide a conference communication system capable of preventing an unscheduled terminal unit from being connected to the conference communication even if a number error or malfunction of an exchange occurs. A further object of the present invention is to provide a conference communication system capable of rejecting connection to an invalid user without identification by a password every time connection. Still a further object of the present invention is to provide a system capable of exactly charging users of the conference communication service for use rates. An additional further object of the present invention is to provide a conference communication system capable of reducing the fixed cost paid for a type I communication carrier managing public networks by a type II communication carrier providing the conference communication service without the need for preparing many access numbers in the public networks. An even further object of the present invention is to provide a system capable of reducing use rates of the conference communication when the type II carrier provides the conference communication service.

The present invention is a system which comprises a private branch exchange capable of incoming from a public network or an extension, and a MCU (Multipoint Control Unit) which is connected to the private branch exchange and interconnects two or more calls incoming to the private branch exchange, and provides conference communication to the incoming calls gaining access to the MCU through the private branch exchange. Here, the present invention is characterized in that there are provided reservation tables in which an outgoing ID (telephone number or identification number of outgoing caller) is associated with a use time, and means for rejecting the connection if the incoming call which does not match with the reservation tables, namely, the outgoing ID is the call which does not match with the contents registered in the reservation tables corresponding to said time. If a call impossible of identification of the outgoing ID comes, the connection is rejected as the call which does not match with the contents registered in the reservation tables.

The outgoing ID can be identified in signals coming from the public network with incoming in ISDN. Also, in general telephone networks managed by NTT, service (number display) in which the incoming side is informed of the outgoing ID on connection has been started in a part of area. By using this service, the outgoing ID can be identified in the incoming side for making connection to the MCU. The reservationtables are a record of certain format written in a memory device.

By such a configuration, an unscheduled person can be prevented from being connected to the conference communication by identifying a user informed of a dial-in number previously registered in the reservation tables by the outgoing ID. Then, when an incoming call comes, the reservation tables are referred to and connection is made, so that a few dial-in numbers may be set for many terminals of the MCU. That is, even if the same dial-in number is specified for access to the conference communication of other groups, it can be identified that a call has gained access to any of conference communications by identifying the outgoing ID to refer to the reservation tables, so that the number of dial-in numbers to be prepared by a provider of the conference communication service can be reduced. By reducing the number of dial-in numbers, the fixed cost paid for a type I carrier can be reduced.

As the private branch exchange for this purpose, using a unit having an OAI (Open Application Interface), the reservation tables are provided in an OAI server connected to the OAI. By this, initiation of the reservation tables and functions of referring to the reservation tables on incoming can be easily implemented. The OAI is an interface set so that a person installing the private branch exchange can apply and modify connection control of the private branch exchange as desired without contact or permission of a manager of the public network connecting the private branch exchange or a manufacturer of the private branch exchange.

Then, the public network is based on ISDN (Integrated Services Digital Network) and may be connected through a line with communication speed of 1500 kb/s. This enables connections of 32 B channels with ISDN of the public network. By this, also, the cost paid for the type I carrier managing the public network can be saved.

One embodiment is configured so that conference communication information includes voice and image information and its information band uses two B channels of an ISDN line. Thus, in the first method, it can be set so that two dial-in numbers are allocated to the reservation tables in order to making connection of the two B channels. Also, in the second method, it can be configured so that one dial-in number is allocated to the reservation tables in order to making connection of the two B channels and the two B channel connection is made using the first incoming call and the second incoming call as which an incoming call of the same outgoing ID incoming within short time (for example, several seconds) from the first incoming call is regarded.

In order to associate the dial-in numbers and the outgoing ID with a reserved time on the reservation tables, it may be configured so that the reservation tables in a standby state other than the reservation table in present use are prepared. That is, n reservation tables in a standby state for times t1, t2, t3, . . . tn incoming every time a are prepared and there may be provided automatic updating means for sequentially replacing the reservation tables in the standby state with the reservation table in present use every time the time a elapses.

By such a configuration, association with the reserved time is simplified. The time a, for example, is any time between one minute and 60 minutes, more specifically, 15 minutes. That is, the conference communication is started from, for example, 0, 15, 30, 45 minutes every hour, and use time is set in 15 minute unit. Every time division of the time a comes, the reservation tables in the standby state are replaced with the reservation table in present use. A user continuing the conference communication over the time a is controlled so that the connection is continued even if the reservation table changes.

A user of the conference communication can previously gain access to the reservation tables and make a reservation. For this purpose, it can be configured so that a provider of the conference communication arranges reception operators and reservations are accepted by telephone and writing operations in the reservation tables in the corresponding standby state are performed. However, when the reception operators are not arranged, an automatic answer unit by telephone lines etc. is provided and information sent by dial tones from a user is recorded and the reservation tables can be set. This can be configured so that the reservation is accepted via the Internet and the reservation is made by showing the reserved state directly to the user. For example, it is configured so that time and available period capable of reserving the conference communication are displayed on a home page of the Internet and a user gains access to the home page to make reservation operations and thereby dial-in numbers to be accessed from ISDN at the use time are shown.

BRIEF DESCRIPTION OF THE DRAWINGS

Specific embodiments of the present invention will now be described, by way of example only, with reference to the accompanying of drawings in which:

FIG. 2a is a schematic configuration illustration of a reservation table (used for a minutes from time t1) of the embodiment of the present invention;

FIG. 2b is a schematic configuration illustration of a reservation table (used for a minutes from time t2) of the embodiment of the present invention.

DETAILED DESCRIPTION OF THE PREFERRED EMBODIMENTS

Figure 1:
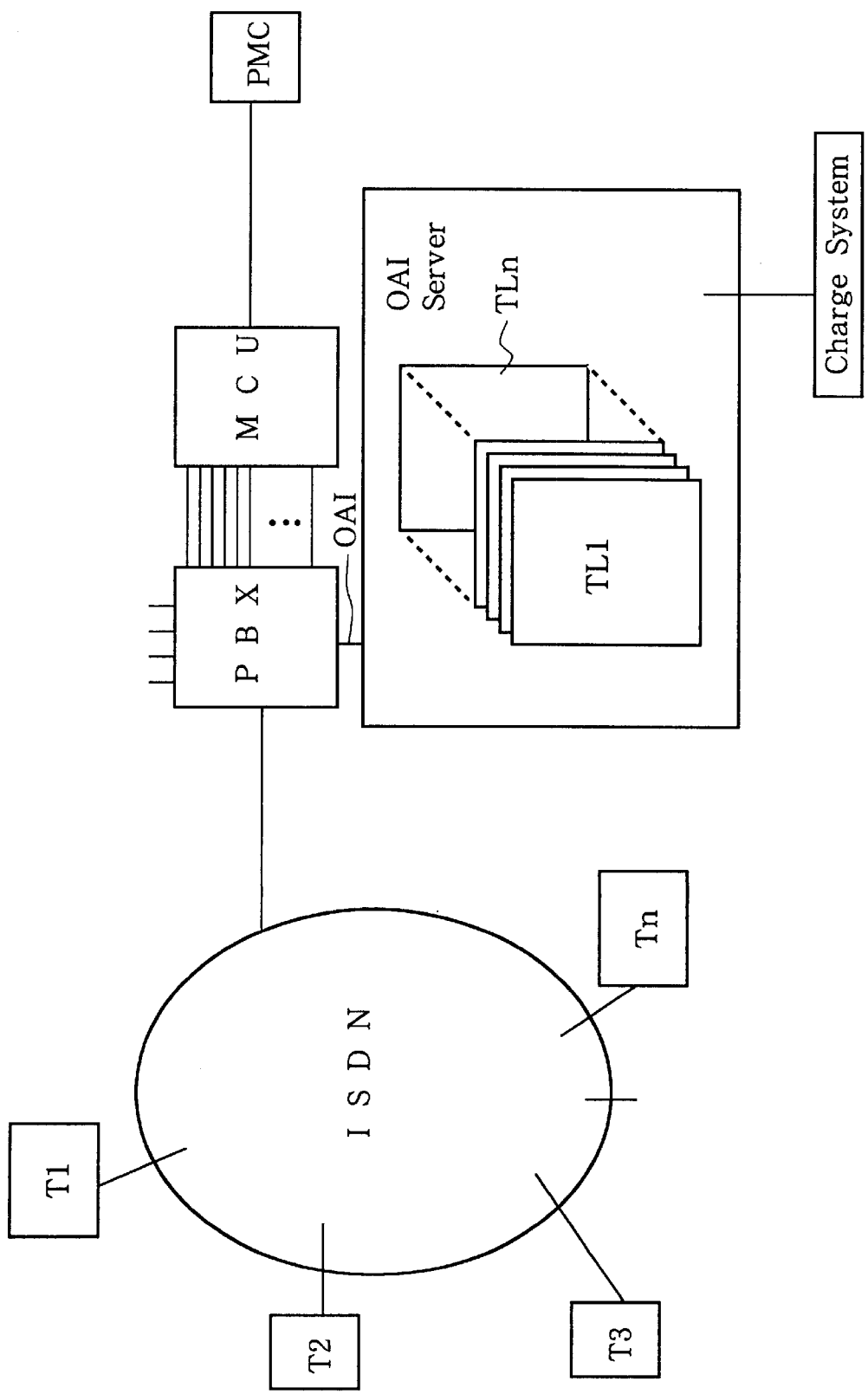
FIG. 1 is a system configuration diagram of an embodiment of the present invention.

FIG. 1 is a system configuration diagram of an embodiment of the present invention. User terminal units T1, T2, T3, . . . Tn are connected to ISDN of a public network. A PBX (private branch exchange) capable of incoming from this public network by dial-in is provided and this PBX has a MCU (Multipoint Control Unit) for interconnecting two or more calls incoming to the PBX. Here, the present invention is characterized by having reservation tables TL1, TL2, . . . TLn in which a dial-in number, an outgoing ID and a reserved time of an incoming call are associated, and means for rejecting connection of the incoming call which does not match with the reservation table (TL1 in present use).

The PBX has an open Application interface and the reservation tables TL1, TL2, . . . TLn are provided in an open application interface server connected by the open application interface. The reservation table TL1 is in present use and the reservation tables TL2, . . . TLn is in a standby state. The reservation table TL1 in present use is presently used from time t1, and the reservation table in the standby state is sequentially replaced with the reservation table in present use to be updated every time the time comes so that the reservation table TL1 becomes invalid and the reservation table TL2 becomes valid when time a elapses and time t2 comes. In this embodiment, a charge system is connected to the open application interface server and charge information on use customers can be collected from information recorded in the invalid updated reservation tables.

The public communication network is based on ISDN and is connected to the PBX through a line with communication speed of 1500 kb/s, and ISDN is connected to conference terminals through lines with communication speed of 64 kb/s. Information of conference communication includes voice information and image information, and two B channels of ISDN lines are used as its information band.

A PMC (Picture-tel Multi Controller) for controlling connection mode and connections is connected to the MCU. Also, it is configured so that the reservation tables TL2, . . . TLn in a standby state of the reservation tables can be accessed from a unit (not shown) to write or modify the setting contents.

FIGS. 2a and 2b show configuration examples of the reservation tables. The reservation tables are prepared for time t1, time t2 coming after time a elapses from the time t1, time t3 coming after time a further elapses from the time t2, etc. and are replaced with the reservation table in present use to be updated every time the times come. Server numbers indicating a terminal of the MCU to be connected corresponding to an outgoing ID and dial-in numbers are registered in the reservation tables. In order to make two B channel connections from user terminal units through ISDN, two dial-in numbers (1 and 2) are registered and a server number is registered in the respective dial-in numbers. The server number corresponds to a terminal number of the MCU, and connections are prepared as a conference communication server used for three party conference communication, four party conference communication, etc. previously.

Operations of the system configured in this manner will be described. A user of conference communication service makes a reservation prior to a conference. This is performed by gaining access to a type II carrier and making connection to a reservation interface and writing ID (telephone number) use desired times and periods of user terminal units T1, T2, T3, . . . Tn connected to ISDN in the reservation tables. When the reservation is accepted, the reservation user is informed of two dial-in numbers of aline (ISN1500) accessed by the user on starting of conference communication. The reason why the two dial-in numbers are used is that connections of two B channels are made.

The type II carrier for providing this conference communication service controls the MCU from the PMC according to the reserved state, and sets connection mode and connections. Generally, conference communication service with participation of three terminal units, conference communication service with participation of four terminal units, etc. are preset at plural terminals and connection can be made by selecting the preset terminals in the case of making the connection of the conference communication service according to the reservation, so that it is unnecessary to modify every time the reservation.

When the reserved time comes on that day, each user terminal unit gains access to the MCU via the PBX by the dial-in numbers. The PBX identifies the dial-in numbers and an outgoing ID of an incoming call, and refers to the reservation table in present use at that time. For the incoming call having been registered in the reservation table, switches are controlled to make connection to the corresponding server (terminal) of the MCU. For the incoming call of the outgoing ID or the dial-in numbers which do not match with registration of the reservation table, a voice or an image that the connection cannot be made due to no reservation is displayed to reject the connection. When all (or a part) of the calls from the reserved user terminal units come and the connection is completed, the users can start the conference communication. When the conference communication is completed, a closing procedure is executed by a completion instruction (click operation of completion window on screen) from the users.

Figure 3:
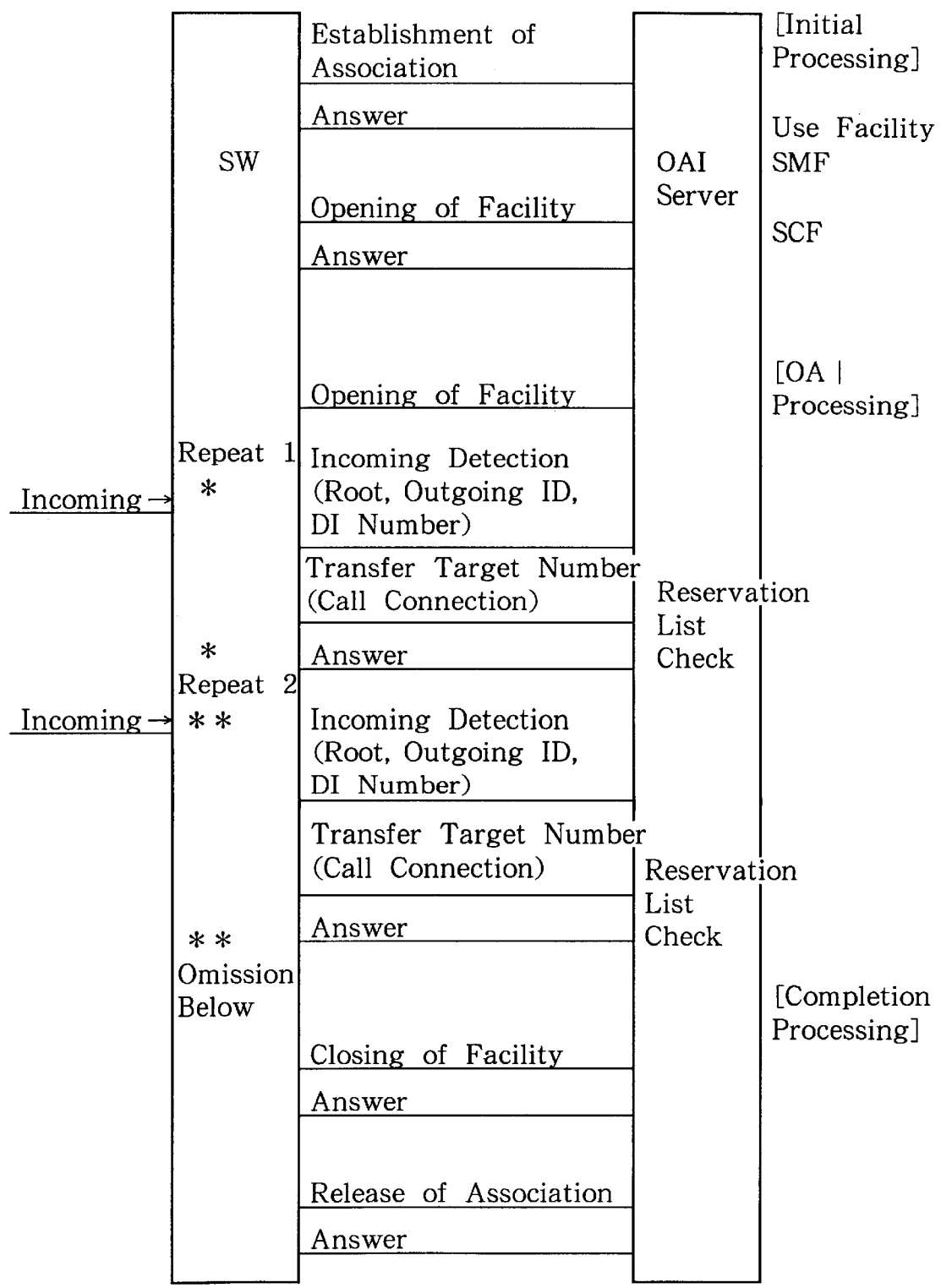
FIG. 3 is a procedure illustration of reservation table check of the embodiment of the present invention.

FIG. 3 shows a connection answer procedure and a closing procedure with completion by an OAI (Open Application Interface) executed between the PBX and the OAI server.

In description of the above embodiment, the two dial-in numbers for connections of the two B channels are allocated and the user sequentially operates the two dial-in numbers to make connection when a reservation is made, but this operations can be performed using one dial-in number. In this case, one dial-in number is allocated to a user on reservation, and the user operates the same dial-in number twice by one B channel to perform a connection request on connection. In the PBX, it can be configured so that the reservation table is referred to by the dial-in number and an outgoing ID and when it is identified that there is a valid incoming call, a timer of short time (several seconds) is started to wait for an incoming call by the same dial-in number and when the incoming call from the same outgoing ID as the dial-in number comes within the short time, connection is made by regarding the two incoming calls as two B channel connection. By making the connection in such a manner, trouble on allocation of the two dial-in numbers to the user can be eliminated.

In the system of the present invention, by recording the connections in each item of the reservation tables in which the reference and connections are performed on connection, the reservation tables can be used as charge information. This charge information is information exactly indicating the actual connections, and exact charge to customers can be made for the conference communication.

In the system of the present invention, since connection of an intruder can be eliminated by referring to the reservation tables, it is unnecessary to make users send a password and validate the users every time connection. However, certification by the password may also be used for overlap identification in the system of the present invention.

As described above, according to the present invention, security of conference communication service can be improved. According to the present invention, an unscheduled or unexpected terminal unit can be prevented from being connected to conference communication. Even if a number error or malfunction of an exchange occurs, an unscheduled terminal unit can be prevented from being connected to the conference communication. In the present invention, since an outgoing ID is identified and reservation tables in which the outgoing ID is associated with a dial-in number are referred to, connection of many calls can be made by a few dial-in numbers, so that the fixed cost paid for a carrier managing public networks every dial-in number can be reduced remarkably. According to the present invention, low-cost conference communication service can be provided to users. Further, in the present invention, an unscheduled user terminal unit can be prevented from being connected to the conference communication without identification operations by a password every time connection.

What is claimed is:

1. A conference communication system comprising:
   a private branch exchange capable of communicating with a public network or an extension,
   a MCU (Multipoint Control Unit) which is connected to the private branch exchange and interconnects two or more calls incoming to the private branch exchange,
   a reservation table that includes telephone numbers for all valid participants in a conference communication at a particular reserved time; and
   means for rejecting connection of the incoming call whose telephone number does not match with the reservation table.

2. A conference communication system as defined in claim 1, wherein the private branch exchange has an OAI (Open Application Interface) and the reservation table is provided in an OAI server connected to the OAI.

3. A conference communication system as defined in claim 2, wherein the public network is based on ISDN (Integrated Services Digital Network) and is connected to the private branch exchange through a line with communication speed of 1500 kb/s.

4. A conference communication system as defined in claim 3, wherein information on conference communication includes voice and image information, and an information band set among terminal units for the conference communication is two B channels of an ISDN line.

5. A conference communication system as defined in claim 4, wherein two dial-in numbers are allocated to the reservation table in order to making connection of the two B channels.

6. A conference communication system as defined in claim 4, wherein one dial-in number is allocated to the reservation table in order to making connection of the two B channels, and there is included means for making the two B channel connection using the first incoming call and the second incoming call as which an incoming call of the same outgoing ID incoming within a predetermined time from the first incoming call is regarded.

7. A conference communication system as defined in claim 2, wherein plural ones of the reservation table are prepared in a standby state for different times t1, t2, t3, . . . , and there is provided automatic updating means for sequentially replacing the reservation tables in the standby state with the reservation table in present use every time the different times come.

8. A conference communication system as defined in claim 7, further comprising means for gaining access to the reservation tables in the standby state and modifying the contents.

9. A conference communication system, comprising:
a private branch exchange (PBX) adapted to be connected to a telephone network;
a server connected to said PBX, said server having plural reservation tables, each of said plural reservation tables being associated with a different time reserved for a conference communication through said PBX and including a list of telephone numbers of valid participants in a conference communication that is scheduled at a respective reserved time; and
a multipoint control unit connected to said PBX that determines whether incoming communications are valid participants by referring to respective ones of the reservation tables and to telephone numbers of incoming communications and that connects only valid participants to a conference communication.

* * * * *